United States Patent
Gass

(10) Patent No.: US 7,545,802 B2
(45) Date of Patent: Jun. 9, 2009

(54) USE OF RTP TO NEGOTIATE CODEC ENCODING TECHNIQUE

(75) Inventor: Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 778 days.

(21) Appl. No.: 11/045,093

(22) Filed: Jan. 31, 2005

(65) Prior Publication Data

US 2005/0174993 A1 Aug. 11, 2005

(30) Foreign Application Priority Data

Feb. 10, 2004 (EP) ................................. 04290336

(51) Int. Cl.
*H04L 12/26* (2006.01)
*H04J 3/14* (2006.01)
*G08C 15/00* (2006.01)
*G06F 11/00* (2006.01)
*G01R 3/08* (2006.01)

(52) U.S. Cl. ........................ 370/352; 370/229; 370/329; 370/465

(58) Field of Classification Search ......... 370/352–465, 370/229–329; 375/240–259; 704/205–209, 704/219–223; 709/224–246
See application file for complete search history.

(56) References Cited

U.S. PATENT DOCUMENTS

| | | | | |
|---|---|---|---|---|
| 6,058,110 | A * | 5/2000 | Bellenger et al. | 370/352 |
| 6,353,666 | B1 * | 3/2002 | Henderson et al. | 379/229 |
| 6,671,367 | B1 | 12/2003 | Graf et al. | |
| 7,035,282 | B1 * | 4/2006 | Jagadeesan et al. | 370/465 |
| 7,047,185 | B1 * | 5/2006 | Younes et al. | 704/201 |
| 7,221,663 | B2 * | 5/2007 | Rodman et al. | 370/329 |
| 7,289,461 | B2 * | 10/2007 | DeJaco et al. | 370/328 |
| 2003/0219006 | A1 * | 11/2003 | Har | 370/352 |
| 2004/0037312 | A1 * | 2/2004 | Spear | 370/465 |
| 2005/0232232 | A1 * | 10/2005 | Farber et al. | 370/352 |

(Continued)

FOREIGN PATENT DOCUMENTS

EP 1 161 038 A 12/2001

(Continued)

OTHER PUBLICATIONS

ITU Recommendation G.726 (originally G.721) General Aspects of Digital Transmission Systems; Terminal Equipments—40, 32, 24, 16 kbit/s Adaptive Differential Pulse Code Modulation (ADPCM).

(Continued)

*Primary Examiner*—M. Phan
(74) *Attorney, Agent, or Firm*—Sughrue Mion, PLLC

(57) ABSTRACT

A method for providing an optimized audio quality communication session between a near end and at least a far end telecommunications terminal requires that at least the codec of the near end telecommunications terminal is able to apply two alternative encoding techniques belonging to the same audio compression protocol. When the near end telecommunications terminal receives a data packet from the far end telecommunications terminal after a setup of the communication session during which the audio compression protocol is set, it will determine out of the received data packet the encoding technique used by the far end telecommunications terminal. This is performed by analyzing the content of the header of the received packet. In case the determined encoding technique is based on a different alternative encoding technique of the audio compression protocol used initially by the near end telecommunications terminal, then an adaptation will be performed.

9 Claims, 3 Drawing Sheets

U.S. PATENT DOCUMENTS

2007/0036229 A1* 2/2007 Gass .................... 375/259

OTHER PUBLICATIONS

G.711 Voice Coder; ITU-T G.711 Voice Coder (1 page), Available at www.hellosoft.com.

G.722 7 kHz Audio Coding Within 64 kbits/s (1 page).

G.723.1 Dual Rate Speech Codec, (2 pages); Available at www.hellosoft.com.

G.726 Speech Codec, Available at www.hellosoft.com.

G.727 Speech Codec (1 page), Available at www.hellosoft.com.

G.728 Speech Codec (1 page), Available at www.hellosoft.com.

G.729./A/B Speech Codec (3 pages), Available at www.hellosoft.com.

* cited by examiner

USE OF RTP TO NEGOTIATE CODEC ENCODING TECHNIQUE

TECHNICAL FIELD

The present invention relates to a method for providing an optimized audio quality communication session between a near end and at least a far end telecommunications terminal possibly over a digital network, each telecommunications terminal having a codec, while at least the codec of the near end telecommunications terminal being able to apply two alternative encoding techniques belonging to the same audio compression protocol. Furthermore, it is related to a near end telecommunications terminal comprising a codec able to apply two alternative encoding techniques belonging to the some audio compression protocol for a communication session with at least a far end telecommunications terminal. It is also related to a computer readable medium having a computer program recorded thereon, the computer program comprising codes adapted to perform steps of the above telecommunications method when said computer program is run on a near end telecommunications terminal comprising a codec able to apply two alternative encoding techniques belonging to the same audio compression protocol. The invention is based on a priority application EP 04 290 336.9 which is hereby incorporated by reference.

BACKGROUND OF THE INVENTION

Telecommunication systems such as the public switched telephone network (PSTN) and private branch exchanges (PBXs) are generally well known. The PSTN is now considered to be a digital system that is capable of carrying data at a theoretical speed of 64 kilobits per second (kbps). Despite many enhancements to the capacity, efficiency and performance that has undergone PSTN over the years, the voice quality is still limited to something less than "true voice" quality for several reasons. How the PSTN delivers voice from one telecommunication terminal to another is the culprit behind limited voice quality.

In transmitting voice from one telecommunications terminal to another several transformations take place. The caller's acoustic voice waves are converted to electrical analog signals by the microphone in the telephone handset of the near end telecommunications terminal which is connected to a central office in the caller's neighborhood through a subscriber line interface circuit. Latter performs duties such as powering the telecommunications terminal, detecting when the caller picks up or hangs up the receiver, and ringing the telecommunications terminal when required. A coder/decoder (codec) converts the analog voice signals to a digital data stream for easy routing through the network and delivery to the central office, located in the recipient's (far end) neighborhood, where the digital data stream is converted back into electrical analog signals. Then the handset speaker of the far end telecommunications terminal finally converts the analog signals to acoustic waves that are heard by the listener. The same process occurs in the opposite direction allowing the caller hearing the recipient voice.

One of the reasons the PSTN limits voice quality is to increase the call capacity of the network by reducing the data rate of each call. The PSTN confines each voice digital data stream to 64 kbit/s. This is achieved by sampling the voice signals at a rate of 8 kHz, and filtering out any frequencies less than 200 Hz and greater than 3.4 kHz. Amplitude compression is also used according to some so called μ-Law in the US or A-Law encoding in Europe resulting in an 8-bit, 8-kHz stream of data. This amplitude compression is part of a pulse code modulation (PCM) encoding techniques according to the ITU-T Recommendation G.711. Reversing this process at the receive end reproduces the caller's voice but without the original quality. This compression and expansion (companding) process of the G.711 algorithm adds distortion to the signal and gives a phone conversation its distinctive "low fidelity" quality. It is directly related to the used narrow bandwidth of about 3.5 kHz.

In lieu of PCM codecs, digital voice/speech codecs may be utilized by a telecommunication system to transmit audio signals in a different manner than the conventional PCM encoding techniques. Assuming that a suitable transmit bandwidth is available, such audio codecs can provide enhanced fidelity voice transmissions by incorporating audio characteristics such as tone, pitch, resonance, and the like, into the transmitted signal. For example, by leveraging the 64 kbps capability of current telephone networks, wideband voice codecs may be designed to provide high fidelity telephone calls in lieu of conventional audio calls that are governed by the PCM encoding protocols. Such high fidelity calls may be transmitted using a bandwidth that exceeds 3.5 kHz, e.g. 7 kHz or more, like defined already under ITU-T Recommendation G.711.

Due to the current standards that govern telecommunications systems, audio codecs may not be universally implemented in the many central offices associated with a given telecommunication system. Accordingly, an end-to-end high fidelity speech connection may not always be achieved if either of the respective central office do not utilize compatible audio codecs. Even if both ends (near and far end) support high fidelity speech communications, there must be a mechanism by which the central offices can communicate to determine whether (and which) wideband audio coding protocols are supported.

A possible signaling technique may simple employ a substantial portion of the normal operating bandwidth to transmit tones, or other signals at the beginning of a communication session. In US 2003/0224815 is described an example based on such technique. Although this procedure may effectively convey the necessary information between the central offices, the transmission of the signaling information may interfere with a call in progress and be noticeable to the end users.

In U.S. Pat. No. 6,353,666 is described an alternative for performing wide band communication sessions. It is time division multiplex (TDM) based, and therefore needs some specific in-band signaling which is proprietary. On FIG. 1 is shown the way a wideband communication session will be set up according to that prior art. At first, the near end telecommunications terminal 1 will send some set up request using some protocol Q.931 to its neighborhood local switch 2. That local switch 2 will forward such set up via integrated services digital network (ISUP) to the neighborhood local switch 3 of the far end telecommunications terminal 4. This local switch 3 will send an alert using the protocol Q.931 to the far end telecommunications terminal. A connect command will be answered by the far end telecommunications terminal 4 to be forward to the near end telecommunications terminal via the ISUP. Then, the near end telecommunications terminal 1 will ask if the far end telecommunications terminal is able to apply a wideband alternative of the encoding technique. After receiving a positive response from the far end telecommunications terminal 4, a second set up will be started followed by a training session between both telecommunications terminals. Only then a wideband telecommunications session will be started based on a proprietary in-band signaling. Such solution has an obvious drawback that it implies to control the codecs of both telecommunications terminals since both must be able to apply the proprietary wideband signaling.

SUMMARY OF THE INVENTION

In view of the above, it is an object of the present invention to provide a method, a telecommunications terminal and some computer program codes for providing an optimized audio quality communication session between two telecommunications terminals over a digital network without requiring the use of a supplementary signaling technique very costly when to be implented. It is also an object of the present invention to provide maximum flexibility when setting up a telecommunication session depending of the capabilities of the respective telecommunications terminal.

This object is achieved in accordance with the invention by applying a method for providing an optimized audio quality communication session between a near end and at least a far end telecommunications terminals over a digital network, each telecommunications terminal having a codec, while at least the codec of the near end telecommunications terminal being able to apply two alternative encoding techniques belonging to the same audio compression protocol. Latter is typically but not exclusively a protocol as set force in ITU-T Recommendation G.721, G.722, G.723 etc. These telecommunications methods comprise the step of setting up a telecommunication session between the two telecommunications terminals by fixing this audio compression protocol to be used between the two codecs. Then follows the step of sending from the near end telecommunications terminal towards the far end telecommunications terminal a data packet using the encoding technique based on the most technically demanding alternative. As a response, the near end telecommunications terminal will receive a data packet from the far end telecommunications terminal. According to the invention, the near end telecommunications terminal will then be able to determine out of said received data packet the encoding technique used by the far end telecommunications terminal. This is simply obtained in analyzing the content of the header of the received packet. In case of the determined encoding technique is based on a different alternative encoding technique of the audio compression protocol used initially by the near end telecommunications terminal, then an adaptation will be performed on that near end telecommunications terminal. The result of that adaptation is the switch for the codec of the near end telecommunications terminal to the determined encoding technique used by that far end telecommunications terminal. Therefore, the telecommunication session between both telecommunications terminals will be proceeded using the alternative encoding technique fixed by the far end telecommunications terminal.

Advantageously, applying the method according to the invention will permit to perform communication session between two telecommunications terminals over a digital network by using by default the most technically demanded alternative encoding technique of the previously agreed audio compression protocol. As an example, this will be for G.711 wideband communication or for G.723 or G.729 an alternative encoding technique comprising voice activity detection (VAD) and possibly comfort noise generation (CNG).

The use of such a method will provide full flexibility without a limiting to a single alternative encoding technique. It is of interest when performing a communication session between several telecommunications terminals to proceed that telecommunication session by using the less technically demanding encoding technique fixed by one of these telecommunications terminals. But as soon as the near end telecommunications terminal will no more receive data packet using the less technically demanding alternative, it is then possible to adapt the encoding technique to be used by the near end telecommunications terminal to the initially used more technically demanding alternative technique.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 1:
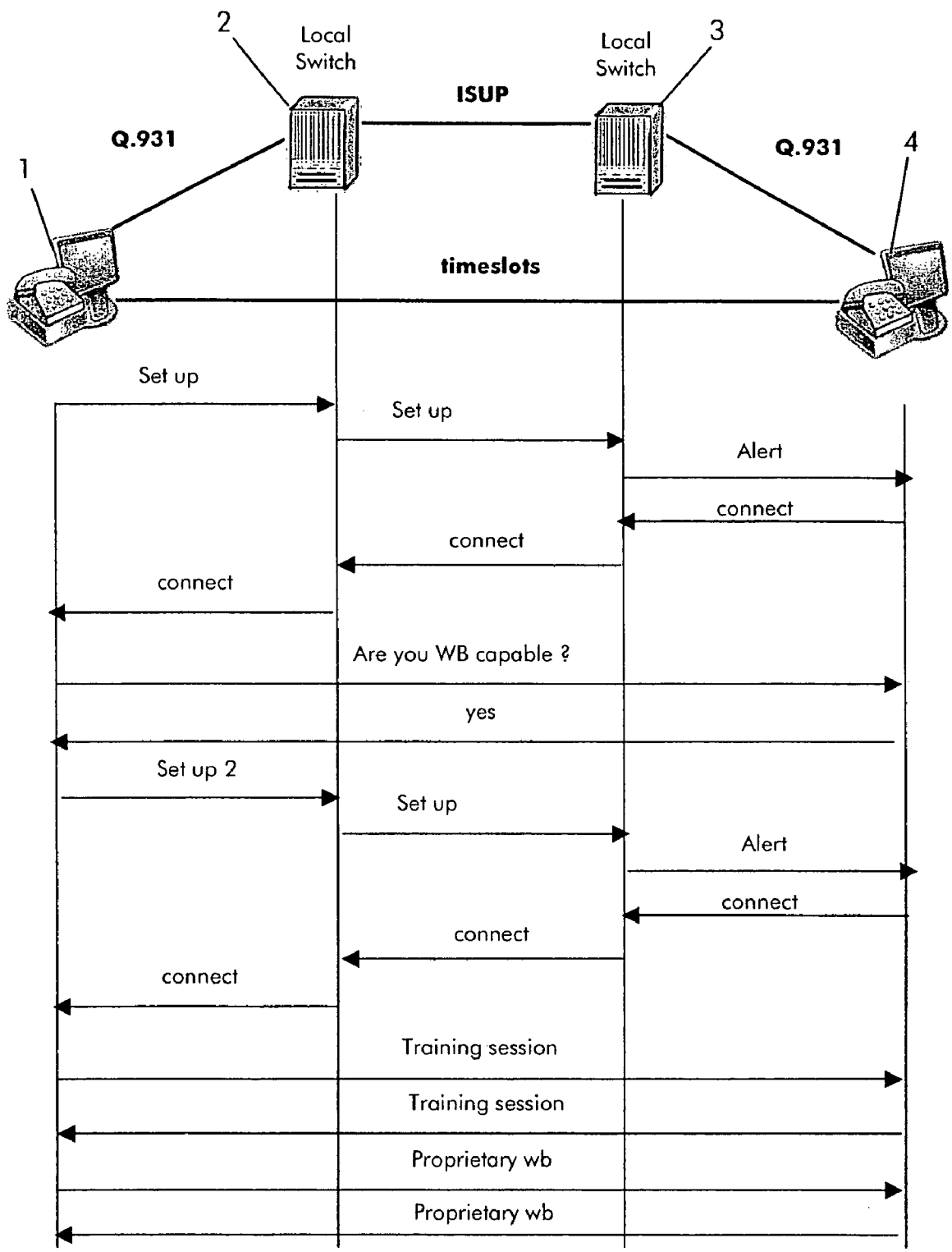
FIG. 1 is a diagram of a set up of a communication session according to prior art.
Figure 2:
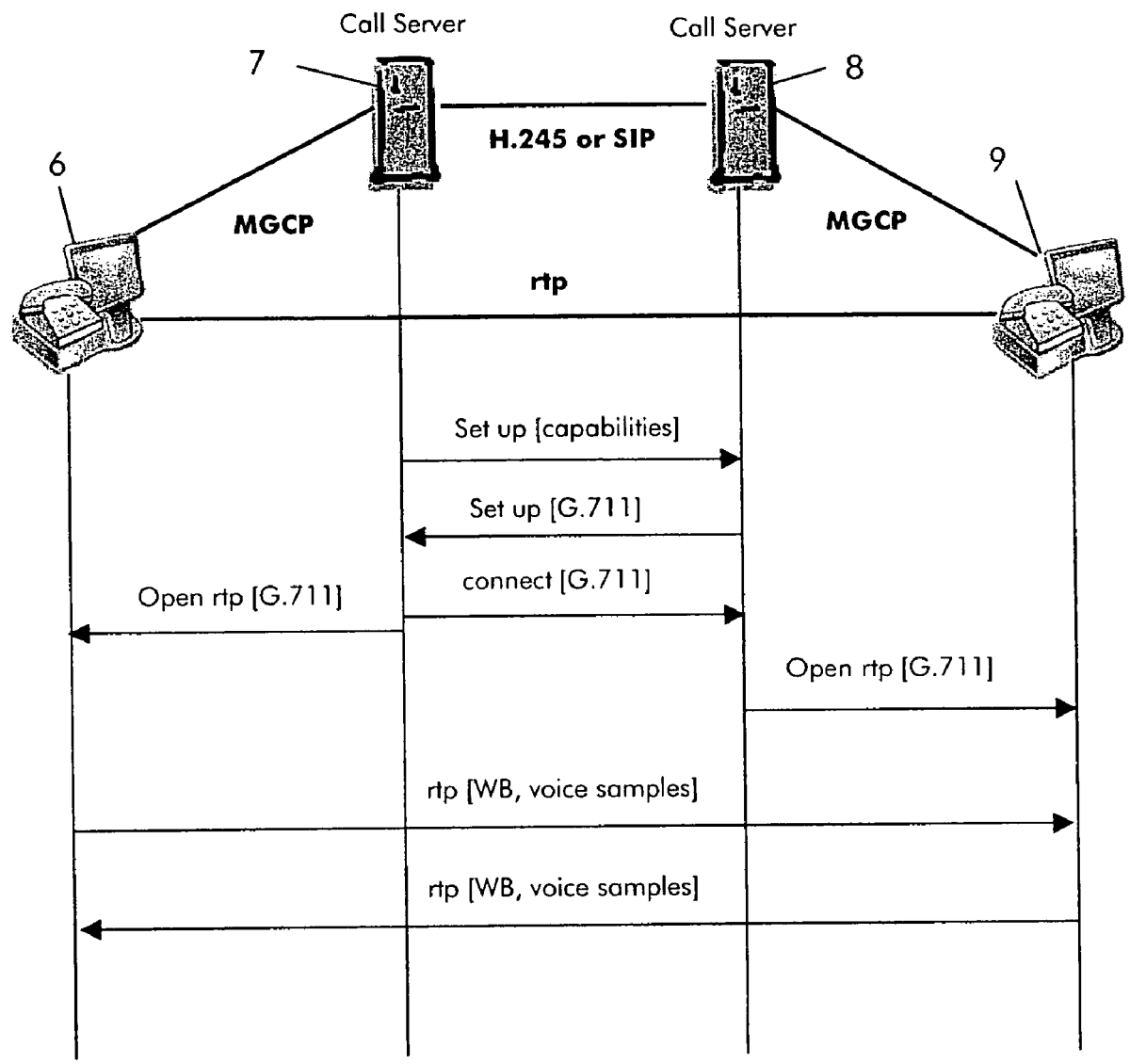
FIG. 2 is a diagram of a set up of a communication session according to an embodiment of the invention.

In FIG. 2 is shown a diagram of the set up of a communication session between two telecommunications terminals according to an embodiment of the invention. The near end telecommunications terminal 6 being possibly an Internet Protocol based phone is connected via a media gateway control protocol to a neighborhood call server 7. Such call server 7 can be part of a PBX or of a Intranet. The far end telecommunications terminal 9 can be a similar IP-phone but not necessarily. That far end telecommunications terminal is also connected to a neighborhood call server 8 via media gateway control protocol (MGCP). The two call server 7, 8 are interconnected via an IP-network or even via the PSTN. In case such PSTN is still of an analog version then a modem (modulator/demodulator) will have to be placed between the respective call server 7, 8 and that analog network to adapt the digital stream into an analog one.

When a new communication session between the near end telecommunications terminal 6 and the far end telecommunications terminal 9 shall be started, the respective neighborhood call server 7, 8 will start some negotiation using a protocol like H.245 or session initiation protocol (SIP). In this negotiation, the call server 7 will ask the capabilities of the call server 8. This is necessary to fix the audio compression protocol to be used between the respective codec of the two telecommunications terminals. Such audio compression protocol can be e.g. G.711, or G.722, or any other one. On the example shown on FIG. 2 the call server 8 answer to the call server 7 that it uses the audio compression protocol according to the recommendation G.711. After the call server 7 agrees to use such audio compression protocol both call server 7, 8 will open a real-time protocol (rtp) channel with a respective telecommunications terminal 6 and 9. After that, a direct connection using rtp is available between the near end telecommunications terminal 6 and the far end telecommunications terminal 9.

The near end telecommunications terminal will then start to send a data packet possibly comprising some voice message or part of it (samples) using the encoding technique based on the most technically demanded alternative belonging to the agreed audio compression protocol. In the present case as shown on FIG. 2, it will be wideband. The far end telecommunications terminal 9 will send as an answer a data packet possibly comprising some voice message or part of it (samples) using some encoding techniques belonging to the agreed audio compression protocol. The choice of the encoding technique to be used by the far end telecommunications terminal 9 will depend on internal parameters or some set up not accessible to the near end telecommunications terminal 6. Therefore, there is no guarantee that the chosen encoding technique to be applied by the codec of the far end telecommunications terminal 9 will correspond to the encoding technique in the present example on FIG. 2 wideband applied by the codec of the near end telecommunications terminal 6. This is why if applying the method according to the invention the data packet send by the far end telecommunications terminal 9 will be analyzed at the near end telecommunications terminal 6. More particularly, the content of the header of the received rtp packet will be read to determine the alternative encoding technique of the agreed audio compression protocol (here G.711) applied by the codec of the far end telecommunications terminal 9.

On FIG. 2 is shown the case where both codecs of the near end telecommunications terminal 6 and far end telecommunications terminal 9 are using the same alternative encoding technique here wideband. In the present case, the communication session will simply proceed without any change of encoding techniques. It has to be noticed that the respective call server 7 and 8 can be also part of the near end telecommunications terminal 6 and/or far end telecommunications terminal 9. This depends on the kind of telecommunications terminals used i.e. an IP-phone or PC like phone or any other kind of telecommunications terminal.

Figure 3:
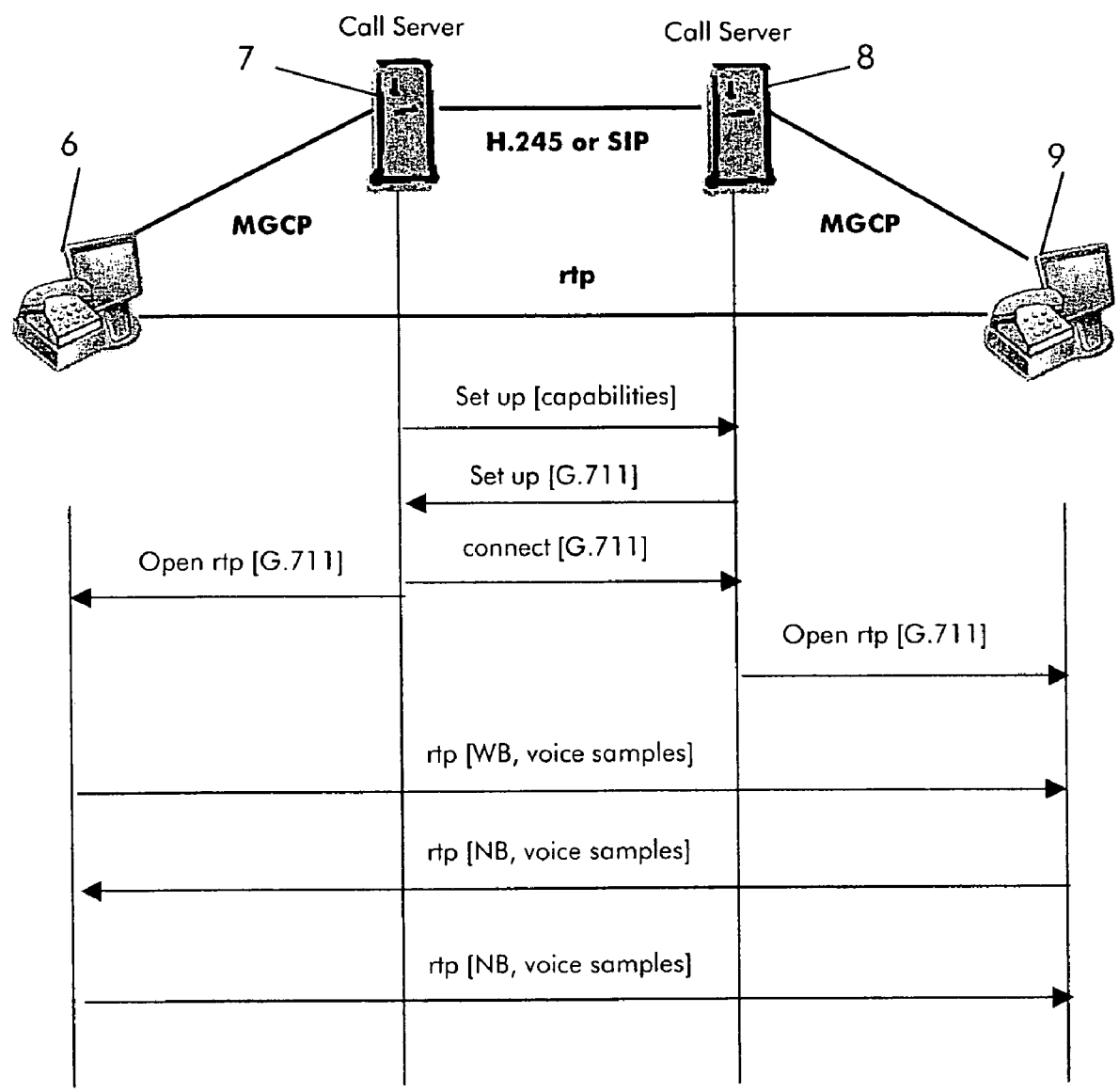
FIG. 3 is a diagram of a set up of a communication session according to an another embodiment of the invention.

On FIG. 3 is shown an alternative embodiment according to the invention. The initiation of the set up of a communication session between the near end telecommunications terminal 6 and the far end telecommunications terminal 9 via the respective call server 7 and 8 is similar to the example on FIG. 2. The example on FIG. 3 differs by the characteristic that the codec of the far end telecommunications terminal 9 applies by default an alternative encoding technique belonging to the previously agreed audio compression protocol but which does not correspond to the alternative encoding technique applied by the codec of the near end telecommunications terminal which is by default the most technically demanding alternative. At the example shown on FIG. 3, this most technically demanding alternative corresponds to the wideband alternative of the audio compression protocol according to G.711. If the communication session would have been set up by agreeing of another audio compression protocol like for example G.723 or G.729 then the most technically demanding alternative encoding technique would correspond to the encoding technique using voice activity detection and possibly but not necessarily comfort noise generation. In the case shown on FIG. 3, the analysis of the header from the data packet send by the far end telecommunications terminal 9 and received by the near end telecommunications terminal 6 will give as a result that the encoding technique used by the codec of the far end telecommunications terminal 9 does not correspond to the alternative encoding technique applied by the codec of the near end telecommunications terminal 6. The result of such analysis performed by some reading means in the near end telecommunications terminal leads to adapt the encoding technique to be used by the codec from the near end telecommunications terminal to be the some as the one applied by the codec of the far end telecommunications terminal 9. In the present case, a change of the applied alternative encoding technique will occur and the communication session will be proceed using the narrowband alternative encoding technique of the agreed audio compression protocol according to G.711.

In the case a communication session will be performed between more than two telecommunications terminals the encoding technique to be used by the codec of the near end telecommunications terminal will have to be adapted to the less technically demanding encoding technique determined out of data packet received from some far end telecommunications terminal. But if during such communication session no more data packets using the less technically demanding encoding technique will anymore be received by the near end telecommunications terminal e.g. due to the off-hook of the corresponding far end telecommunications terminal then it is possible to adapt the encoding technique to be used by the near end telecommunications terminal to the initially used more technically demanding encoding technique. In any case the encoding technique to be applied by the codec of the near end telecommunications terminal i.e. the telecommunications terminal from which the communication session will be started will be set up by default at first to the most technically demanding alternative encoding technique of the previously agreed audio compression protocol. In such a way, there is no need of some supplementary signaling acting as some kind of agreement between the codec to fixed not only the audio compression protocol to be used but also the alternative encoding technique. The possible adaptation if necessary of the encoding technique to be used by the near end telecommunications terminal will occur during the rtp session i.e. without any interruption of the transfer of audio samples.

Such a method according to the invention can be advantageously performed by some codes being part of some computer program recorded in a computer readable medium. When said computer program is run on a telecommunications terminal initiating a communication session (near end telecommunications terminal). Such telecommunications terminal comprises a codec able to apply two alternative encoding techniques belonging to the some audio compression protocol.

At a set up of a communication session between these telecommunications terminal (near end) and at least a far end telecommunications terminal, the audio compression protocol to be used between the codecs will be fixed. The codes of the computer program are adapted to perform the steps of sending from the near end telecommunications terminal towards the far end telecommunications terminal a data packet using the encoding technique based on the most technically demanding alternative. Furthermore, the codes are adapted to determine from some received data packet send by the far end telecommunications terminal the encoding technique used by that telecommunications terminal. And finally, the codes are adapted to fix the encoding technique to be used by the codec of the near end telecommunications terminal according to the determined encoding technique from that data packet so that the codec of the near end telecommunications terminal will work according to the same alternative of the previously agreed audio compression protocol used by the codec of the far end telecommunications terminal. It is possible to conceive the computer program comprising the above codes in such a way that most of the existing telecommunications terminals can be upgraded with such computer program. In such a way, the realization of the solution proposed by the present invention solving the above quoted problem can be rather easily implemented in without implying too high costs.

The invention claimed is:

1. A method for providing an optimized audio quality communication session between a near end and at least a far end telecommunications terminals, each telecommunications terminal having a codec, while at least the codec of the near end telecommunications terminal being able to apply two alternative encoding techniques belonging to the same audio compression protocol, the telecommunications method comprising the steps of:

setting up a communication session between the two telecommunications terminals by fixing the audio compression protocol to be used between the two codecs;

sending from the near end telecommunications terminal towards the far end telecommunications terminal a data packet using the encoding technique based on the most technically demanding alternative;

receiving by the near end telecommunications terminal a data packet from the far end telecommunications terminal;

whereby the further steps of:

determining by the near end telecommunications terminal out of said received data packet the encoding technique used by the far end telecommunications terminal;

in case said determined encoding technique being based on a different alternative encoding technique of the audio compression protocol then adapting the encoding technique to be used by the near end telecommunications terminal to said determined encoding technique when proceeding said communication session, wherein said codec of the near end telecommunications terminal is operable to apply the two alternative encoding techniques belonging to the same audio compression protocol.

2. The method according to claim 1 whereby adapting the encoding technique to be used by the near end telecommunications terminal to the less technically demanding encoding technique determined out of data packets received from some far end telecommunications terminal when proceeding said communication session with more than one far end telecommunications terminal.

3. The method according to claim 1 whereby adapting the encoding technique to be used by the near end telecommunications terminal to the initially used more technically demanding encoding technique when no more data packet using the less technically demanding alternative will be received.

4. The method according to claim 1 whereby the most technically demanding alternative encoding technique corresponding to a wide-band encoding technique.

5. The method according to claim 1 whereby the most technically demanding alternative encoding technique corresponding to an encoding technique comprising voice activity detection and possibly comfort noise generation.

6. A near end telecommunications terminal comprising a codec operable to apply two alternative encoding techniques belonging to the same audio compression protocol for a communication session with at least a far end telecommunications terminal while the codec of the near end telecommunications terminal to send a first data packet uses the encoding technique based on the most technically demanding alternative of the audio compression protocol fixed during a previous set up of a communication session between the two telecommunications terminals wherein the near end telecommunications terminal comprises reading means to determine the alternative encoding technique out of the data packet received from the far end telecommunications terminal such that the alternative encoding technique is used by the codec from the near end telecommunications terminal when proceeding with the communication session, wherein said codec of the near end telecommunications terminal is operable to apply the two alternative encoding techniques belonging to the same audio compression protocol.

7. The near end telecommunications terminal according to claim 6 wherein the most technically demanding alternative encoding technique corresponds to a wide-band encoding technique.

8. The near end telecommunications terminal according to claim 6 wherein the most technically demanding alternative encoding technique corresponds to an encoding technique comprising voice activity detection and possibly comfort noise generation.

9. A computer readable medium having a computer program recorded thereon, the computer program comprising codes which perform the following steps when said computer program is run on a near end telecommunications terminal comprising a codec operable to apply two alternative encoding techniques belonging to the same audio compression protocol after a setting up of a communication session between this near end telecommunications terminal and a far end telecommunications terminal during which the audio compression protocol to be used between the codecs of the near end and the far end telecommunications terminals to be fixed:

sending from the near end telecommunications terminal towards the far end telecommunications terminal a data packet using the encoding technique based on the most technically demanding alternative;

receiving by the near end telecommunications terminal a data packet from the far end telecommunications terminal;

determining by the near end telecommunications terminal out of said received data packet the encoding technique used by the far end telecommunications terminal;

wherein said determined encoding technique is based on a different alternative encoding technique of the audio compression protocol then the encoding technique to be used by the near end telecommunications terminal when initiating said communication session, wherein said codec of the near end telecommunications terminal is operable to apply the two alternative encoding techniques belonging to the same audio compression protocol.

\* \* \* \* \*